United States Patent
Ouzineb et al.

(10) Patent No.: US 8,993,654 B2
(45) Date of Patent: Mar. 31, 2015

(54) GRAFT COPOLYMER LATICES

(75) Inventors: Keltoum Ouzineb, Lyons (FR); José Pierre, Drogenbos (BE); Johann Billiani, Graz (AT); Gerhard Reidlinger, Graz (AT); Philippe Deligny, Waterloo (BE)

(73) Assignees: Allnex Belgium SA., Brussels (BE); Allnex Austria GmbH, Werndorf (AU)

( * ) Notice: Subject to any disclaimer, the term of this patent is extended or adjusted under 35 U.S.C. 154(b) by 0 days.

(21) Appl. No.: 13/978,964

(22) PCT Filed: Jan. 27, 2012

(86) PCT No.: PCT/EP2012/051380
§ 371 (c)(1),
(2), (4) Date: Jul. 10, 2013

(87) PCT Pub. No.: WO2012/101270
PCT Pub. Date: Aug. 2, 2012

(65) Prior Publication Data
US 2013/0289159 A1 Oct. 31, 2013

(30) Foreign Application Priority Data
Jan. 27, 2011 (EP) .................... 11152443

(51) Int. Cl.
| | | |
|---|---|---|
| C08F 290/08 | (2006.01) | |
| C08F 290/14 | (2006.01) | |
| C09D 151/08 | (2006.01) | |
| C08G 18/36 | (2006.01) | |
| C08G 18/42 | (2006.01) | |
| C08G 18/81 | (2006.01) | |

(52) U.S. Cl.
CPC ............ *C09D 151/08* (2013.01); *C08F 290/08* (2013.01); *C08F 290/141* (2013.01); *C08G 18/36* (2013.01); *C08G 18/4288* (2013.01); *C08G 18/8108* (2013.01)
USPC .......................... 523/122; 523/457; 524/457

(58) Field of Classification Search
USPC ................... 523/122, 501; 524/457
See application file for complete search history.

(56) References Cited

U.S. PATENT DOCUMENTS

| | | | |
|---|---|---|---|
| 3,810,855 A * | 5/1974 | Tugukuni et al. ............. | 523/513 |
| 4,273,690 A | 6/1981 | Walus | |
| 6,369,135 B1 | 4/2002 | Schork et al. | |
| 6,380,281 B1 | 4/2002 | Gooch et al. | |
| 6,627,700 B1 | 9/2003 | Kadambande et al. | |
| 2010/0160551 A1* | 6/2010 | Marlow et al. ................ | 524/801 |

FOREIGN PATENT DOCUMENTS

| | | |
|---|---|---|
| WO | 2010/074750 | 7/2010 |
| WO | 2011/121085 | 10/2011 |

OTHER PUBLICATIONS

International Search Report issued Apr. 12, 2012 in International (PCT) Application No. PCT/EP2012/051380.

* cited by examiner

*Primary Examiner* — Nathan M Nutter
(74) *Attorney, Agent, or Firm* — Wenderoth, Lind & Ponack, L.L.P.

(57) ABSTRACT

The invention relates to a graft copolymer latex comprising the which comprises a graft copolymer ABC of at least one olefinically unsaturated monomer C and at least one modified alkyd resin A2B or modified oil A1B which modified alkyd resin A2B or modified oil A1B have chain-pendant olefinically unsaturated groups, to a process for its preparation, and the use thereof a binder in coating compositions.

15 Claims, No Drawings

GRAFT COPOLYMER LATICES

The invention relates to graft copolymer latices, to a process for their preparation, and to a use thereof as binders for coating compositions.

Miniemulsion polymer latices have gained scientific and commercial interest over the last few years. A large number of patent applications have been published that emphasise the usefulness of such polymer latices for the preparation of coating compositions for paints and adhesives. These polymer latices comprise copolymers of olefinically unsaturated monomers, particularly acrylic monomers, and a so-called co-stabiliser or hydrophobe which can be a polymer or a monomeric hydrophobic compound such as a fatty alcohol (cetylalcohol as a frequently used example) or a paraffin such as hexadecane. If a polymer having residual unsaturation is used, graft copolymers can be formed. An example is given in U.S. Pat. No. 6,380,281 B1 where an unsaturated polyester resin is dissolved in a mixture of olefinically unsaturated monomers to produce a graft copolymer. Alkyd resins are used as graft substrate in U.S. Pat. No. 6,369,135 B1. It has been found therein that a high mass fraction of alkyd resin, viz. 48% or higher, is needed to provide the desired storage stability of the dispersions. This condition limits the freedom to design the properties of the coating films prepared from such latices.

Miniemulsions and latices made therefrom have been described in WO 2010/074 750 A1. Linking of the olefinically unsaturated groups to the alkyd substrate is effected via an ester bond. In U.S. Pat. No. 6,627,700, aqueous dispersions of acrylate-modified alkyd resins have been described where allyl groups bound to the alkyd resin. This alkyd resin is emulsified with a nonionic emulsifier, and present in the following graft copolymerisation step. Due to the chemically bound emulsifier, the water uptake is very high in coating films made from such systems. Graft copolymerisation of acrylic monomers onto an alkyd resin is made in solution, using isocyanatoethyl methacrylate as one of the monomers which reacts with the hydroxyl groups present in the alkyd resin. Latices have not been described or suggested.

It has therefore been an object of this invention to prepare graft copolymer latices that allow a lower mass fraction of alkyd resins or also, oil, in the graft copolymer latex. Lowering the mass fraction of alkyd resins or oils and thus increasing the mass fraction of the polymer formed from olefinically unsaturated monomers, particularly acrylic polymers or copolymers, provides coatings with faster physical drying and improved durability, yellowing and UV light resistance, higher hardness, and scratch resistance.

This object has been realised by the use of modified alkyd resins or oils as graft substrate, where at least a part of the hydroxyl groups present in the alkyd resin or oil were consumed before the graft reaction by reaction with an unsaturated isocyanate.

The invention relates therefore to a graft copolymer latex which comprises a graft copolymer ABC of at least one olefinically unsaturated monomer C and at least one modified alkyd resin A2B or modified oil A1B which modified alkyd resin A2B or modified oil A1B have chain-pendant olefinically unsaturated groups. These chain-pendant olefinically unsaturated groups are chemically bound to the alkyd resin or oil via a urethane linkage. Preferably, there is an aliphatic, aromatic, or mixed aliphatic-aromatic divalent group —X— between the urethane group and the olefinic unsaturation which is chain-pendant, the group —X— having from one to twenty carbon atoms, and optionally being substituted, and wherein one or more —$CH_2$— groups present in —X— may be replaced by —O—, —NH—, or —NR—, where R is an alkyl group which may be linear, branched or cyclic, and may have from one to ten carbon atoms. The chain-pendant olefinically unsaturated groups are bound to the carbon-carbon chain in the alkyd resin A2 or oil A1 by reacting at least a part of the alcoholic hydroxyl groups present in the said alkyd resin or oil with an olefinically unsaturated isocyanate B under addition and formation of a urethane linkage.

The invention also relates to a multi-step process for the preparation of a graft copolymer latex which process comprises a step (a) of reacting a hydroxy-functional oil A1 or a hydroxy-functional alkyd resin A2 with an olefinically unsaturated isocyanate B under addition and formation of a urethane bond, to form a modified oil A1B or a modified alkyd resin A2B, having urethane groups and chain-pendant olefinically unsaturated groups, a step (b) of forming a pre-emulsion by dissolving the modified oil A1B or modified alkyd resin A2B, or a mixture of these, formed in step (a), in at least one olefinically unsaturated monomer C to form a solution, and then, dispersing this solution in a mixture of water and at least one emulsifier to form a pre-emulsion, and subjecting this pre-emulsion to high shear to reduce the droplet size to a median of the diameter of not more than 300 nm, as measured by dynamic or by static light scattering, and a step (c) comprising subjecting the emulsion of step (b) to a radically induced polymerisation process whereby a mixture of polymers is formed which mixture comprises a graft copolymer ABC formed by concurrent polymerisation of the at least one olefinically unsaturated monomer C, and of the modified alkyd resin A2B or modified oil A1B, initiated by a radical formed from the radical initiator, to obtain a polymer latex comprising a graft copolymer ABC.

The invention further relates to a method of use of a graft copolymer polymer latex ABC to prepare coating compositions for substrates such as wood, fabricated wood, paper, cardboard, textiles, plaster, stone, concrete, glass, ceramics, and metals.

DETAILED DESCRIPTION OF THE PREFERRED EMBODIMENTS

A graft copolymer is defined, for the purpose of the present invention, as a special type of branched copolymer in which the side chains are distinct from the main chain by a difference in their chemical structure or chemical nature, or both. "Chemical structure" of a polymer is meant to refer to the kind of linkage between the repeating units of the polymer, such as in an addition polymer of olefinically unsaturated monomers, a single bond between two carbon atoms, or in a condensation polymer of multifunctional acids and multifunctional alcohols, the ester linkages. Chemical nature is meant to refer to the class of compounds the monomers belong to, such as olefins, vinyl compounds, alcohols, acids, amines, or isocyanates.

The oils A1 preferably have, on average, at least one olefinic unsaturation within a molecule and mandatorily, an average of at least 0.5 hydroxyl groups per molecule. Natural oils are usually triesters of glycerol with fatty acids A11. Hydroxy functionality is imparted to an oil where at least a part of the fatty acids are hydroxy-functional fatty acids, by transesterification of a natural oil with hydroxyl-functional fatty acids, or by partial alcoholysis of natural oils with additional di- or polyhydric alcohols. Olefinic unsaturation can be imparted to an oil by the presence of unsaturated fatty acids as ester-forming component.

Preferably, native oils are used for the invention that have an average of at least 0.5 hydroxy-functional fatty acids in their molecules, and optionally, also at least one unsaturated fatty acid per molecule. In a preferred embodiment, the oil comprises an ester of glycerol with at least one fatty acid that has both an olefinical unsaturation and a hydroxyl group per molecule. Such fatty acids are 2-hydroxy fatty acids such as 2-hydroxy linoleic acid, 2-hydroxy linolic acid, and 2-hydroxyoleic acid; omega-hydroxy fatty acids such as 10-hydroxydecanoic acid, 18-hydroxyoctadecenoic acid, and most preferred, fatty acids having a hydroxy group in the middle part of the molecule such as 12-hydroxy-9-octadecenoic acid (ricinoleic acid), and 9-hydroxy-10t,12t-octadecadienoic acid (dimorphecolic acid). A particularly preferred oil is castor oil, and also, its hydrogenation product which is free of olefinical unsaturation, also referred to as "castor wax".

Other oils which are particularly useful for this invention are the so-called transesterified oils where hydroxyl groups are generated by heating oils in the presence of dihydric or polyhydric alcohols such as ethylene glycol, propylene glycol, glycerol, or trimethylol propane, preferably in the presence of alkaline catalysts such as metal alkoxides. The hydroxyl group content of these transesterified oils can be selected by selecting the amount of dihydric or polyhydric alcohol and its number of hydroxyl groups per molecule. The desired viscosity of these oils can be adjusted by heating the oil before or after transesterification under exclusion of oxygen to 250° C. (the so-called "stand oils", "Standöl").

Preferred oils have a hydroxyl number of between 10 mg/g and 80 mg/g, particularly preferred between 20 mg/g and 60 mg/g, an acid number of less than 15 mg/g, particularly preferred of less than 10 mg/g, and a specific amount of substance of carbon-carbon double bonds of from 1 mol/kg to 8 mol/kg, particularly preferred of from 2 mol/kg to 7 mol/kg.

The alkyd resins A2 preferably have, on average, at least one olefinic unsaturation within a molecule and mandatorily, an average of at least 0.5 hydroxyl groups per molecule. The alkyd resins A2 useful for the invention are made by reacting fatty acids A21, or esters A22 of fatty acids A21 with polyhydric alcohols A23, polyhydric alcohols A24 having at least two hydroxyl groups per molecule, aliphatic or aromatic polycarboxylic acids A25 having at least two acid groups per molecule or anhydrides thereof if they exist, and optionally, one or more of mono-carboxylic acids A26 and monohydric alcohols A27. Hydroxy functionality can be imparted to the alkyd resin by the use of hydroxy-functional fatty acids, or by using a stoichiometric excess of polyhydric alcohols. Olefinic unsaturation can be imparted to the alkyd resin by the use of at least one of unsaturated fatty acids, olefinically unsaturated polycarboxylic acids, olefinically unsaturated monocarboxylic acids, and olefinically unsaturated monohydric alcohols.

Preferred alkyd resins have a hydroxyl number of between 5 mg/g and 80 mg/g, particularly preferred between 10 mg/g and 60 mg/g, an acid number of less than 15 mg/g, particularly preferred of less than 10 mg/g, and a specific amount of substance of carbon-carbon double bonds of from 1 mol/kg to 8 mol/kg, particularly preferred of from 2 mol/kg to 7 mol/kg.

The olefinically unsaturated isocyanate B can be a mixed aliphatic-aromatic isocyanate such as 3-isopropenyl-alpha,alpha-dimethylbenzyl-isocyanate or 4-isopropenyl-alpha,alpha-dimethylbenzyl-isocyanate, the reaction product of one molecule of a hydroxyalkyl ester of an olefinically unsaturated carboxylic acid, preferably of hydroxyethyl (meth)acrylate or hydroxypropyl(meth)acrylate, with one molecule of a diisocyanate which may be aromatic or aliphatic, the reaction product of an unsaturated aliphatic alcohol such as allyl alcohol or methallyl alcohol, with one molecule of a diisocyanate which may be aromatic or aliphatic, and also purely aliphatic isocyanates such as 2-propenoyl isocyanate, 2-methyl-2-propenoyl isocyanate, allyl isocyanate and methallyl isocyanate. It has been found that for the purpose of the present invention, such molecules are particularly useful where the olefinic unsaturation (a >C=C< group) and isocyanate group —N=C=O are separated by a divalent group with the two bonds separated by a sequence of at least three atoms, at least two of which are carbon atoms. Particularly preferred is 3-isopropenyl-alpha,alpha-dimethylbenzyl-isocyanate.

The olefinically unsaturated monomers C are preferably esters C1 of olefinically unsaturated carboxylic acids C11 having from three to eight carbon atoms and at least one carboxyl group, with aliphatic linear or branched or cyclic alcohols C12 having from one to eight carbon atoms such as methyl (meth)acrylate, ethyl (meth)acrylate, n-butyl (meth)acrylate, iso-butyl (meth)-acrylate, n-hexyl(meth)acrylate, 2-ethylhexyl(meth)acrylate, n-decyl(meth)acrylate, t-butyl (meth)acrylate, cyclohexyl(meth)acrylate, and isobornyl (meth)acrylate, dimethyl maleinate, dibutyl fumarate, and the dimethyl ester of tetrahydrophthalic acid, esters C2 of aliphatic linear or branched or cyclic alcohols C22 having from nine to forty, preferably from thirteen to thirty-eight, and particularly preferred, from sixteen to thirty-six, carbon atoms with the acids C11, and esters C3 of the acids C11 with dihydric or polyhydric aliphatic linear, branched or cyclic alcohols C32 having from two to ten carbon atoms and at least two hydroxyl groups such as hydroxyethyl (meth)acrylate and hydroxypropyl(meth)acrylate, cyclohexane dimethanol di(meth)acrylate, glycerol mono- and di-(meth)acrylate, and trimethylolpropane mono- and di-(meth)acrylate. Other vinyl monomers are vinylaromatics such as styrene, and para-methyl styrene, olefinically unsaturated nitriles such as acrylonitrile or methacrylonitrile, or the free acids C11 may also be used, preferably in mixture with at least one of the esters C1 and C2. It is preferred to have a mass fraction of at least 3% of monomers C2 present in the total mass of monomers C. Particularly preferably, this mass fraction is at least 4%, and especially preferred, at least 5%.

The graft polymerisation is initiated by the commonly used radical initiators that are well-known in the art. Useful initiators for the purposes of this invention are azo compounds and peroxide compounds that decompose upon heating to form radicals which act as active centres for monomer addition. Among the useful compounds, particular preference is given to azo initiators, preferably azobis(isobutyronitrile), azobis(cyclohexanecarbonitrile), and azobis(valeronitrile), peroxyesters, preferably tert.-butyl peroctoate, amyl peroctoate, and also inorganic peroxosalts such as preferably, ammonium persulphate.

Graft copolymers ABC are preferred in which the mass fraction of moieties derived from A and B and C in ABC are from 10% to 80% for A, from 0.5% to 20% for B, and from 10% to 89.5% for C. When calculating the masses of the moieties in this context, the corresponding olefinically unsaturated compounds are used, such as the olefinically unsaturated hydroxy-functional oil A1 or alkyd resin A2, the olefinically unsaturated isocyanate B, and the olefinically unsaturated monomer C.

It is preferred that the fraction of unsaturation derived from the olefinically unsaturated isocyanate B in AB has a lower limit of 0.5%, particularly preferably of 0.75%, and especially preferred, of 1.0%, and an upper limit of 20%, particularly preferably of 15%, and especially preferred, of 10%.

The emulsions of the graft copolymers ABC preferably have a mass fraction of solids of between 40% and 60%, particularly preferred, from 44% to 55%.

The graft copolymer latex of the present invention can be used with preference as a binder for a coating composition, the preparation of the coating composition comprising mixing the graft copolymer latex with at least one of pigments, fillers, defoamers, anti-settling agents, wetting agents, thickeners, biocides, and coalescing agents to form a coating composition, and applying the coating composition to a substrate. It is also possible to admix at least one further binder to this coating composition, wherein the at least one further binder is selected from the group consisting of acrylic dispersions, polyurethane dispersions, and alkyd resin dispersions. The oxydative drying may be accelerated by addition of at least one siccative to the coating composition.

The invention is further illustrated by the following examples which are not intended to be limiting. The following physicochemical properties are used to characterise the emulsions:

The hydroxyl number is defined according to DIN EN ISO 4629 (DIN 53 240) as the ratio of the mass of potassium hydroxide $m_{KOH}$ having the same number of hydroxyl groups as the sample, and the mass $m_B$ of that sample (mass of solids in the sample for solutions or dispersions); the customary unit is "mg/g".

The iodine number is defined according to DIN 53 241-1 as the ratio of the mass of iodine $m_I$ which is added under discolouration to the olefinic double bonds of a sample, and the mass $m_B$ of that sample (mass of solids in the sample for solutions or dispersions); the customary unit is "g/(100 g)" which is the same as "g/hg" or "cg/g".

The specific unsaturation is the ratio of the amount of substance of olefinically unsaturated groups >C=C< in a chemical compound or a mixture of chemical compounds, and the mass of the said compound or mixture of compounds, its customary unit is "mol/kg".

The mass fraction of solids is the ratio of the mass of solids which may be dissolved, or dispersed in a solution or dispersion, and the mass of the solution or dispersion, its usual unit being "cg/g" which is the same as "%".

The acid number is defined, according to DIN EN ISO 2114 (DIN 53 402), as the ratio of that mass $m_{KOH}$ of potassium hydroxide which is needed to neutralise the sample under examination, and the mass $m_B$ of this sample, or the mass of the solids in the sample in the case of a solution or dispersion; its customary unit is "mg/g".

Other physicochemical parameters such as dynamic viscosity have their accepted meaning.

Example 1

Modified Triglyceride Oil with Increased Degree of Olefinic Unsaturation 925 g of castor oil having a hydroxyl number of 164 mg/g, and an iodine number of 86 cg/g, corresponding to a specific unsaturation of 3.39 mol/kg, were heated under a nitrogen purge to 70° C. Within thirty minutes, 210 g of 3-isopropenyl alpha, alpha-dimethylbenzyl isocyanate were added via a dropping funnel into the well-stirred reactor, while keeping the temperature during addition constant at 70° C. When the addition was completed, the reactor was heated over fifteen minutes to 100° C., and kept under continued stirring for one further hour. 1 g of tin(II)-ethylhexanoate were then added, and the temperature was allowed to rise to 110° C. during the slight exotherm. The reaction mixture was kept under stirring for one further hour whereafter a sample drawn revealed no remaining unreacted isocyanate groups, measured in accordance with DIN EN ISO 11909. After cooling to room temperature, a sample drawn had a mass fraction of solids of 99%, and a dynamic viscosity measured at 23° C. and a shear rate of 25 $s^{-1}$, of 2010 mPa·s. The specific unsaturation, measured as the ratio of the amount of substance of olefinic unsaturation (carbon-carbon double bonds) to the mass of resin, was 3.67 mol/kg.

Example 2

Preparation of an Alkyd Resin 600 g of linseed oil fatty acid (mixture of fatty acids obtained from linseed oil, having an iodine number of 182 cg/g, and an acid number of 201 mg/g), 65 g of glycerol, 135 g of trimethylol propane, and 170 g of phthalic anhydride were charged together with 500 g of xylene into a reactor and heated with stirring under nitrogen purge to 230° C. This temperature was kept, and water generated during esterification was removed by azeotropic distillation with the xylene which latter was returned to the reactor. After 4.5 h, an acid number of 4 mg/g was reached. 4 g of phthalic anhydride were then added to adjust the viscosity to 4500 mPa·s on a sample taken from the reactor and measured at 23° C. and a shear rate of 25 $s^{-1}$. The specific unsaturation, measured as the ratio of the amount of substance of olefinic unsaturation (carbon-carbon double bonds) to the mass of resin, was 4.8 mol/kg.

Example 3

Modified Alkyd Resin with Increased Degree of Olefinic Unsaturation 950 g of the alkyd resin of Example 2 were charged to a reactor and heated under nitrogen purge to 70° C. 60 g of isopropenyl alpha, alpha-dimethylbenzyl isocyanate were added slowly under stirring during thirty minutes while keeping the temperature at 70° C. After completion of the addition the reactor contents were heated to 100° C. during fifteen minutes, and kept at this temperature for one hour. 1 g of tin(II) 2-ethylhexanoate were then added, the exothermic reaction setting in raised the temperature to 110° C. This temperature was held for one more hour until the mass fraction of isocyanate groups in the reaction mass, measured in accordance with DIN EN ISO 11909, had reached a value of zero. After cooling, a mass fraction of solids of 99% and a dynamic viscosity of 8450 mPa·s, at 23° C. and a shear rate of 25 $s^{-1}$, were determined on a sample drawn. The specific unsaturation, measured as the ratio of the amount of substance of olefinic unsaturation (carbon-carbon double bonds) to the mass of resin, was 4.89 mol/kg.

Example 4

Preparation of Pre-Emulsions 260.74 g of deionised water and 40 g of an emulsifier (®Disponil FES 32, sodium fatty alcohol ether sulphate, obtained from Cognis GmbH) were charged into a reaction vessel and stirred to form a homogeneous solution. 110 g of the alkyd resin of Example 2 were diluted by addition of a mixture of 204.89 g of methyl methacrylate ("MMA"), 44.8 g of 2-ethylhexyl acrylate ("2EHA"), 14 g of acrylic acid ("AA"), and 16.31 g of stearyl methacrylate ("SMA") to form a homogeneous solution which was added to the emulsifier solution under stirring. High-speed stirring at 1200 $\text{min}^{-1}$ was continued for thirty minutes after the addition had been completed, speed was then reduced to 50 $\text{min}^{-1}$ for sixty minutes until the foam had disappeared. This pre-emulsion 4c was then subjected to sonication with a sonifier (Hielscher Sonifier Model UP 400S) for five minutes at an output of 400 W whereupon the droplets in the sonicated pre-emulsion had a median of the diameter of 185 nm, measured with an Auto-sizer ("Zetasizer nano S" obtained from Malvern). The beaker containing the pre-emulsion 4c was immersed in an ice and water bath during sonication to maintain constant temperature and to avoid undesirable premature polymerisation.

Further pre-emulsions were made using masses of ingredients according to table 1.

TABLE 1

Pre-Emulsions

| Pre-Emulsion | | 4a | 4b | 4c | 4d | 4e | 4f |
|---|---|---|---|---|---|---|---|
| Oil | | Castor Oil | of Ex. 1 | | | | |
| Alkyd Resin | | | | of Ex. 2 | of Ex. 3 | of Ex. 2 | of Ex. 3 |
| mass of oil or alkyd resin | in g | 110 | 110 | 110 | 110 | 60 | 60 |
| mass of water | in g | 260.74 | 260.74 | 260.74 | 260.74 | 260.74 | 260.74 |
| mass of emulsifier | in g | 40 | 40 | 40 | 40 | 40 | 40 |
| mass of MMA | in g | 204.89 | 204.89 | 204.89 | 204.89 | 204.89 | 204.89 |
| mass of 2EHA | in g | 44.8 | 44.8 | 44.8 | 44.8 | 44.8 | 44.8 |
| mass of AA | in g | 14.0 | 14.0 | 14.0 | 14.0 | 14.0 | 14.0 |
| mass of SMA | in g | 16.31 | 16.31 | 16.31 | 16.31 | 16.31 | 16.31 |

Example 5

Preparation of Hybrid Dispersions and Polymerisation

Hybrid dispersions 5a through 5e were made from each of the pre-emulsions 4a through 4f according to the following procedure:

A reaction vessel was charged with 100 g of deionised water and heated to 84° C. 0.8 g of ammonium peroxodisulphate $(NH_4)_2S_2O_8$ were added as initiator, followed by addition of 700 g of the individual pre-emulsions 4a through 4e of Example 4 jointly with an additional initiator solution (2.4 g of ammonium peroxodisulphate in 14.4 g of deionised water) over a period of three hours. Reaction was continued for one further hour whereafter the reaction mass was cooled to 60° C. Starting concurrently, 2 g of a 10% strength solution of ®Luperox H 70 (tert.-butyl hydroperoxide, obtained from Arkema SA, Puteaux) in water as solvent were added over fifteen minutes, and 4 g of a 5% strength solution of ®Rongalit C (sodium hydroxymethanesulfinate, obtained from Brüggemann Chemical) in water were added over thirty minutes. After completed addition, reaction was continued for thirty further minutes. Starting concurrently again, 2 g of a 10% strength solution of ®Luperox H 70 (v. s.) were added over fifteen minutes, and 4 g of a 5% strength solution of ®Rongalit C (v. s.) were added over thirty minutes. The reaction mixture was then cooled to room temperature (20° C.), and the resulting mixture was stirred well for ten minutes. The polymer latex was then passed through a filter having a pore size of 250 µm.

The following properties were determined on samples of the dispersions:

TABLE 2

Properties of the Dispersions

| Dispersion | | 5a | 5b | 5c | 5d | 5e | 5f |
|---|---|---|---|---|---|---|---|
| Z-average particle size⁺ | in nm | 197 | 222 | 198 | 214 | 193 | 207 |
| mass fraction of solids | in % | 48.8 | 47.8 | 49.0 | 48.9 | 44.1 | 44.1 |
| viscosity* | in mPa · s | 96 | 132 | 144 | 276 | 512 | 460 |

⁺average particle size as measured by photon correlation spectroscopy (Auto-Sizer, v. s.)
*dynamic viscosity of the dispersion measured at 23° C. and a shear rate of 25 $s^{-1}$ The polymer latices 5b, 5d and 5f formed were stable during the reaction, no coagulation was observed during polymerisation, and there was no noticeable filter residue (grits not passing the filter). Contrary to this finding, during the formation of polymer latices 5a, 5c, and 5e, coagulum has been observed on the reactor wall during polymerisation, and a significant amount of grits, viz., a mass fraction of more than 3% of the polymer formed, remained on the filter during discharge of the latices.

Example 6

Application Test

To the freshly prepared dispersions of Example 5, viz. dispersions 5a through 5f, an aqueous combination siccative dispersion was admixed, made from solutions of cobalt borate/neodecanoate, zirconium octoate, and lithium neodecanoate, in organic solvents using a non-ionic emulsifier with a HLB value of 13, with the following mass fractions w of the named metals in the siccative dispersion: w(Co)=5%, w(Zr)=7.5%, w(Li)=0.22%, calculated as the ratio of the mass of the metal and the mass of the aqueous siccative dispersion, to yield coating compositions 6a through 6f. The amount of siccative was chosen so that the ratio of the mass m(SD) of the siccative dispersion to the mass m(BR) of the binder resin was 2%. Films with a wet film thickness of 100 µm made from these coating compositions were applied to cleaned glass plates. The plates were dried at 20° C., and the appearance of the films was recorded after one day. Hardness of the coating films was measured after predetermined intervals to record the crosslinking kinetics. The results are summarised in table 3.

TABLE 3

Results of Application Tests

| Coating Composition | | 6a | 6b | 6c | 6d | 6e | 6f |
|---|---|---|---|---|---|---|---|
| Appearance+ after 1 day | | hazy | slightly hazy | hazy, fish eyes | sligthly hazy | fish eyes | transparent |
| Hardness* after 1 day | in s | 20 | 36 | 82 | 82 | 47 | 63 |
| Hardness* after 1 week | in s | 22 | 46 | 149 | 175 | 73 | 102 |
| Hardness* after 2 weeks | in s | 71 | 134 | 149 | 181 | 82 | 109 |
| Hardness* after 4 weeks | in s | | | | 166 | 199 | 93 | 125 |
| Hardness* after 8 weeks | in s | | | | 186 | 226 | | |

+Appearance was judged by visual inspection of the films
*Hardness was measured with a Persoz pendulum tester according to ISO 1522 after various periods of storage at 23° C. and 50% of relative humidity in a drying chamber.

It can be seen that by slightly increasing the unsaturation through reaction of the oil (an increase of 10%) or alkyd (an increase of 2%) with the unsaturated isocyanate, the compatibility is markedly increased which translates into better film homogeneity, as seen in the visual inspection of the coating films, as well as faster and more denser crosslinking as seen in the time dependence of the hardness of the coating film. This drastic improvement could not have been expected from the small increase in the specific unsaturation in the oil or alkyd. Likewise, the storage stability of the final latex has been improved by modification of the oil or alkyd resin with the unsaturated isocyanate as no phase separation has been observed at the macroscopic level (see example 5).

Example 7

Comparative Experiments 7.1 Solution Graft Copolymer

An alkyd-acrylic graft copolymer was prepared according to Example 2 of U.S. Pat. No. 4,273,690. In the first step, a mixture was prepared from 778 g of dehydrated castor oil fatty acids, 1182 g of soybean fatty acids, 343 g of benzoic acid, 816 g of pentaerythritol, 417 g of phthalic anhydride, 233 g of isophthalic acid, and 2.8 g of dibutyl tin oxide, in the presence of 146 g of xylene as solvent, under a nitrogen blanket. This mixture was heated to reflux temperature under stirring for six hours and removal of the water formed in a trap until when an acid number of less than 5 mg/g was obtained. A mixture of 243 g of toluene and 228 g of diethylene glycol dimethyl ether was then added, and the resulting alkyd resin was allowed to cool to ambient temperature (23° C.). This alkyl resin had a mass fraction of solids of 85%, an acid number of 3.5 mg/g, and a number average molar mass, measured by GPC using polystyrene standards for calibration, of 2100 g/mol.

In a second step, 440 g of this alkyd resin solution was charged into a polymer kettle, and heated under a nitrogen blanket to reflux temperature whereupon approximately 10 g of solvent accompanied by remaining water were collected. 8 g of 2-isocyanatoethyl meth-acrylate dissolved in 80 g of diethyleneglycol dimethyl ether were added over fifteen minutes under stirring. 0.2 g of dibutyltin dilaurate as catalyst were then added, the mixture obtained was stirred for thirty minutes at 130° C. The reaction mixture was then cooled to 90° C., and 110 g of acetone were added under stirring. A monomer mixture 1 of 340 g of methyl methacrylate, 80 g of butyl methacrylate, 17 g of methacrylic acid, and 18 g of dodecyl mercaptan was prepared separately, this monomer mixture was added to the stirred reaction mixture at the reflux temperature of 88° C. Two further mixtures were prepared separately, a monomer mixture 2 comprising 120 g of methyl methacrylate, 40 g of butyl methacrylate, 25 g of methacrylic acid, and 200 g of ethylene glycol monobutyl ether; and an initiator and solvent mixture of 16 g of azobis isobutyronitrile, 30 g of acetone, 50 g of methyl ethyl ketone, 100 g of ethylene glycol monobutyl ether, and 37 g of ethylene glycol monobutyl ether acetate. Monomer mixture 2 was added to the reaction mixture over period of sixty minutes, and starting at the same time, the initiator and solvent mixture was added over a period of ninety minutes, the temperature being kept at reflux temperature. The reaction mixture was stirred for a further thirty minutes to complete the reaction, and then cooled to 23° C. The graft copolymer solution has a mass fraction of solids of 60%, the acid number of the copolymer was 27 mg/g, and its number average molar mass, determined by GPC as supra, was 7000 g/mol.

7.2 Dispersion Graft Copolymer

An alkyd acrylic graft copolymer was prepared according to Example 3 of U.S. Pat. No. 6,627,700. Into a polymer kettle equipped with reflux condenser, water separator and stirrer, 193.8 g of juvandol fatty acid, 193.8 g of sunflower fatty acid, 16.9 g of benzoic acid, 204.1 g of trimethylol propane, 14.1 g of diethylene glycol, 114.9 g of isophthalic acid, 0.11 g of tin oxide hydrate, 106.6 g of hexahydrophthalic acid, 69.4 g of trimethylol propane monoallyl ether, and 33.2 g of xylene were charged and mixed well under a nitrogen blanket. The mixture was heated to 230° C. under stirring for four hours until an acid number of less than 10 mg/g was obtained. After cooling to 160° C., 53.2 g of trimellithic anhydride were added to the reaction mixture. The temperature was increased to 180° C., and the reaction was continued under stirring for one further hour until an acid number of 33 mg/g had been reached. All of the xylene solvent had distilled off, together with the water formed in the reaction.

In the second step, 130.9 g of the alkyd resin thus prepared, 410.8 g of deionised water, 13.8 g of a nonionic emulsifier (Pluriol® A 10 R, ethylene oxide-propylene oxide copolymer having a reactive unsaturated group, BASF SE), and 23.1 g of ethylene glycol monobutyl ether were charged into a resin kettle equipped with a stirrer, a reflux condenser and two feed vessels, and heated under stirring to 80° C. 19.3 g of diethanolamine were added thereto under stirring, to yield a mixture having a mass fraction of solids of 25%. A monomer mixture was prepared from 58.5 g of styrene, 44.2 g of hydroxyethyl methacrylate, 70.1 g of butyl acrylate, and 16.1 g of methacrylic acid, and added to the alkyd resin emulsion under stirring over three hours. At the same starting time, a solution of 9.83 g of tert.-butyl peroxy 2-ethyl hexanoate in 6.1 g of 1,2-butanediol were added through the second feed vessel, over three and one quarter hours. After this latter feed was completed, the mixture was subjected to post-polymerisation for four hours at 82° C. At this temperature, a second monomer mixture comprising 33.1 g of styrene, 22.6 g of hydroxypropyl methacrylate, 54.2 g of butyl acrylate was added over two hours, and at the same starting time, a solution of 5.9 g of tert.-butyl peroxy 2-ethyl hexanoate in 3.1 g of 1,2-propanediol was added via the second feed vessel, over two hours and one quarter. After this latter feed was completed, the resulting dispersion was subjected to post-polymerisation at 82° C. for further four hours. Deionised water was added to adjust the mass fraction of solids to 48%. The dispersed graft copolymer had an acid number of 33.5 mg/g, a hydroxyl number of 84 mg/g, and a glass transition temperature of 6.5° C.

7.3 Application Test

Coating compositions were prepared from the graft copolymers of examples 7.1 and 7.3 according to the following recipe:

TABLE 4

Coating Compositions

| constituent | paint 7.31 | | paint 7.32 | |
|---|---|---|---|---|
| graft copolymer | solution of 7.1 | 169 g | dispersion of 7.2 | 300 g |
| siccative | Co/Li/Zr* | 2.0 g | Co/Li/Zr* | 6.0 g |
| neutralising agent | triethylamine | 4.9 g | ammonia$^+$ | 2.3 |
| deionised water | | 190 g | | 0 g |

$^+$aqueous solution with a mass fraction of $NH_3$ in the solution of 25%
*aqueous combination siccative dispersion made from solutions of cobalt borate/neodecanoate, zirconium octoate, and lithium neodecanoate, in organic solvents using a non-ionic emulsifier with a HLB value of 13, with the following mass fractions of the named metals in the siccative dispersion: $\omega(Co) = 5\%$, $\omega(Zr) = 7.5\%$, $\omega(Li) = 0.22\%$ The properties tested, in comparison to the coating compositions of example 6, are summarised in the following table:

TABLE 5

Test Results for the Comparative Coating Compositions

| Coating Composition | Water Absorption in g/m² | | Persoz Hardness in s | | |
|---|---|---|---|---|---|
| | after 1 d | after 4 d | after 1 d | after 5 d | after 8 d |
| 7a | 80 | 162 | 315 | 324 | 330 |
| 7b | 367 | 458 | 27 | 49 | 50 |
| 6 (range) | 20 . . . 45 | 45 . . . 100 | 20 . . . 82 | 100 . . . 136 | 110 . . . 150 |

Water absorption was tested on wood panels which were covered with a dry film of 80 g/m², which were put into contact with water during the period stated. Persoz hardness was measured as described supra.

Both comparative coating compositions showed much higher water absorption, and although 7a has much higher and faster hardness development that the coatings prepared with the inventive coating compositions, the coating composition of 7a has the disadvantage that there is a need to leave the solvent in the composition as gelation occurs if the solvent is removed.

The invention claimed is:

1. A graft copolymer latex comprising a graft copolymer ABC of at least one olefinically unsaturated monomer C and at least one modified alkyd resin A2B or modified oil A1B, which modified alkyd resin A2B or modified oil A1B are modified by reacting a hydroxy-functional alkyd resin A2 or a hydroxy-functional oil A1 with an olefinically unsaturated isocyanate B under addition and formation of a urethane bond to have chain-pendant olefinically unsaturated groups which are linked to the carbon atom chain of the alkyd resin or oil via a urethane group,
wherein the olefinically unsaturated isocyanate B is selected from the group consisting of mixed aromatic-aliphatic olefinically unsaturated isocyanates, reaction products of one molecule of a hydroxyalkyl ester of an olefinically unsaturated carboxylic acid with one molecule of a diisocyanate which may be aromatic or aliphatic, the reaction product of an unsaturated aliphatic alcohol with one molecule of a diisocyanate which may be aromatic or aliphatic, and purely aliphatic isocyanates, and
wherein the monomer C is selected from the group consisting of esters C1 of olefinically unsaturated carboxylic acids C11 having from three to eight carbon atoms and at least one carboxyl group with aliphatic linear or branched or cyclic alcohols C12 having from one to eight carbon atoms, esters C2 of aliphatic linear or branched or cyclic alcohols C22 having from nine to forty carbon atoms with the acids C11, esters C3 of the acids C11 with dihydric or polyhydric aliphatic linear, branched or cyclic alcohols C32 having from two to ten carbon atoms and at least two hydroxyl groups, styrene, para-methyl-styrene, olefinically unsaturated nitriles, the free acids C11, and mixture thereof.

2. The graft copolymer latex of claim 1 wherein the chain-pendant olefinically unsaturated groups are chemically bound to the alkyd resin or oil via a urethane linkage and an aliphatic, aromatic, or mixed aliphatic-aromatic divalent group —X— having from one to twenty carbon atoms, and which may optionally be substituted.

3. The graft copolymer latex of claim 2 wherein one or more —$CH_2$— groups present in the group —X— are replaced by —O—, —NH—, or —NR—, where R is an alkyl group which may be linear, branched or cyclic, and may have from one to ten carbon atoms.

4. The graft copolymer latex according to claim 1 wherein the olefinically unsaturated monomer C is selected from the group consisting of
esters C1 of olefinically unsaturated carboxylic acids C11 having from three to eight carbon atoms and at least one carboxyl group, with aliphatic linear or branched or cyclic alcohols C12 having from one to eight carbon atoms,
esters C2 of aliphatic linear or branched or cyclic alcohols C22 having from nine to forty carbon atoms with the acids C11,
esters C3 of the acids C11 with dihydric or polyhydric aliphatic linear, branched or cyclic alcohols C32 having from two to ten carbon atoms and at least two hydroxyl groups,
vinyl monomers selected from the group consisting of styrene, para-methyl-styrene, nitriles of the acids C11, and the free acids C11, and
mixtures thereof.

5. The graft copolymer latex of claim 4 wherein the olefinically unsaturated monomer C comprises a mass fraction of at least 3% of monomers C2 in a total mass of monomers C.

6. A multi-step process for preparing the graft copolymer latex as claimed in claim 1 which process comprises
a step (a) of reacting a hydroxy-functional oil A1 or a hydroxy-functional alkyd resin A2 with an olefinically unsaturated isocyanate B under addition and formation of a urethane bond, to form a modified oil A1B or a modified alkyd resin A2B, having urethane groups and chain-pendant olefinically unsaturated groups, wherein the olefinically unsaturated isocyanate B is selected from the group consisting of mixed aromatic-aliphatic olefinically unsaturated isocyanates, reaction products of one molecule of a hydroxyalkyl ester of an olefinically unsaturated carboxylic acid with one molecule of a diisocyanate which may be aromatic or aliphatic, the reaction product of an unsaturated aliphatic alcohol with one molecule of a diisocyanate which may be aromatic or aliphatic, and purely a step (b) of forming a pre-emulsion by dissolving the modified oil A1B or modified alkyd resin A2B, or a mixture thereof, formed in step (a), in at least one olefinically unsaturated monomer C to form a solution, and then, dispersing this solution in a mixture of water and at least one emulsifier to form a pre-emulsion, and subjecting this pre-emulsion to high shear to reduce the droplet size to a median of the diameter of not more than 300 nm, as measured by dynamic or by static light scattering, wherein the monomer C is selected from the group consisting of esters C1 of olefinically unsaturated carboxylic acids C11 having from three to eight carbon atoms and at least one carboxyl group, with aliphatic linear or branched or cyclic alcohols C12 having from one to eight carbon atoms, esters C2 of aliphatic linear or branched or cyclic alcohols C22 having from nine to forty carbon atoms with the acids C11, esters C3 of the acids C11 with dihydric or polyhydric aliphatic linear, branched or cyclic alcohols C32 having from two to ten carbon atoms and at least two hydroxyl groups, styrene, para-methyl-styrene, olefinically unsaturated nitriles, and the free acids C11, and a step (c) comprising subjecting the emulsion of step (b) to a radically induced polymerisation process whereby a mixture of polymers is formed which mixture comprises a graft copolymer ABC formed by concurrent polymerisation of the at least one olefinically unsaturated monomer C, and of the modified alkyd resin A2B or modified oil A1B, initiated by a radical formed from the radical initiator, to obtain a polymer latex comprising a graft copolymer ABC.

7. The process of claim 6 wherein an oil A1 is used that has a hydroxyl number of between 10 mg/g and 80 mg/g.

8. The process of claim 6 wherein an oil A1 is used that has a specific amount of substance of carbon-carbon double bonds of from 1 mol/kg to 8 mol/kg.

9. The process of claim 6 wherein an alkyd resin A2 is used that has a hydroxyl number of between 5 mg/g and 80 mg/g.

10. The process of claim 6 wherein an alkyd resin A2 is used that has a specific amount of substance of carbon-carbon double bonds of from 1 mol/kg to 8 mol/kg.

11. The process of claim 6 wherein in the olefinically unsaturated isocyanate B, the olefinic unsaturation and the isocyanate group are separated by at least three atoms, at least two of which are carbon atoms.

12. The process of claim 6 wherein the olefinically unsaturated isocyanate B is 3-isopropenyl-alpha,alpha-dimethyl-benzyl-isocyanate.

13. A method for producing a coating composition, comprising mixing the graft copolymer latex of claim 1 with at least one of siccatives, pigments, fillers, defoamers, anti-settling agents, wetting agents, thickeners, biocides, and coalescing agents to form the coating composition.

14. The method of claim 13, wherein at least one further binder is admixed to the coating composition, wherein the at least one further binder is selected from the group consisting of acrylic dispersions, polyurethane dispersions, and alkyd resin dispersions.

15. The method of claim 13 wherein the graft copolymer latex of claim 1 is mixed with at least one siccative to form the coating composition.

* * * * *